US011999052B2

(12) United States Patent
Kim et al.

(10) Patent No.: US 11,999,052 B2
(45) Date of Patent: Jun. 4, 2024

(54) ROBOT FOR DETECTING AND SAVING LIFE IN SMALL SPACE

(71) Applicants: KOREA INSTITUTE OF ROBOT AND CONVERGENCE, Pohang-si (KR); KOREA UNIVERSITY RESEARCH AND BUSINESS FOUNDATION, Seoul (KR)

(72) Inventors: Jong Geol Kim, Pohang-si (KR); Mao Lin Jin, Pohang-si (KR); Dong Bin Shin, Pohang-si (KR); Dae Hie Hong, Seoul (KR); Seung Sub Oh, Pohang-si (KR); Kap Ho Seo, Pohang-si (KR)

(73) Assignees: KOREA INSTITUTE OF ROBOT AND CONVERGENCE, Pohang-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 531 days.

(21) Appl. No.: 17/295,436

(22) PCT Filed: Nov. 26, 2019

(86) PCT No.: PCT/KR2019/016343
§ 371 (c)(1),
(2) Date: May 20, 2021

(87) PCT Pub. No.: WO2020/111716
PCT Pub. Date: Jun. 4, 2020

(65) Prior Publication Data
US 2022/0001552 A1    Jan. 6, 2022

(30) Foreign Application Priority Data
Nov. 26, 2018    (KR) .......................... 10-2018-0147459

(51) Int. Cl.
*B25J 15/00*    (2006.01)
*A62C 99/00*    (2010.01)
(Continued)

(52) U.S. Cl.
CPC ....... *B25J 15/0019* (2013.01); *A62C 99/0072* (2013.01); *B25J 9/065* (2013.01);
(Continued)

(58) Field of Classification Search
CPC ................................................ A62C 99/0072
See application file for complete search history.

(56) References Cited

U.S. PATENT DOCUMENTS

2008/0064921 A1    3/2008    Larkin et al.
2013/0302129 A1*   11/2013   Smith .................. B25J 15/0066
                                                                414/800
(Continued)

FOREIGN PATENT DOCUMENTS

JP    2005-193344 A    7/2005
KR    10-2013-0121301 A    11/2013
(Continued)

OTHER PUBLICATIONS

USPTO Machine Translation (retrieved from FIT database) of the Description of JP 2005193344 A, Nakajima et al., Jul. 21, 2005. (Year: 2023).*

(Continued)

*Primary Examiner* — Daniel D Yabut
(74) *Attorney, Agent, or Firm* — Revolution IP, PLLC

(57) ABSTRACT

A robot for detecting and saving a life, includes: a body part including a plurality of unit joints; a head part which is provided at the front of the body part in the direction in which the body part moves forward, and which has a gripper capable of picking up an object by a plurality of tongs parts that are folded and unfolded; and an extension part capable (Continued)

of extending forward from the head part so as to enter a small space that is difficult for the body part to enter.

8 Claims, 2 Drawing Sheets

(51) Int. Cl.
*B25J 9/06* (2006.01)
*B25J 9/16* (2006.01)
*B25J 13/08* (2006.01)

(52) U.S. Cl.
CPC ........... *B25J 9/1697* (2013.01); *B25J 13/087* (2013.01); *B25J 15/0028* (2013.01)

(56) References Cited

U.S. PATENT DOCUMENTS

2016/0107013 A1   4/2016  Yaacov
2018/0207456 A1*  7/2018  Katz ....................... B05B 15/68

FOREIGN PATENT DOCUMENTS

KR   10-2014-0013116 A   2/2014
KR   10-2017-0123732 A   11/2017

OTHER PUBLICATIONS

International Search Report for PCT/KR2019/016343 mailed Mar. 20, 2020 from Korean Intellectual Property Office.

* cited by examiner

[FIG. 1]
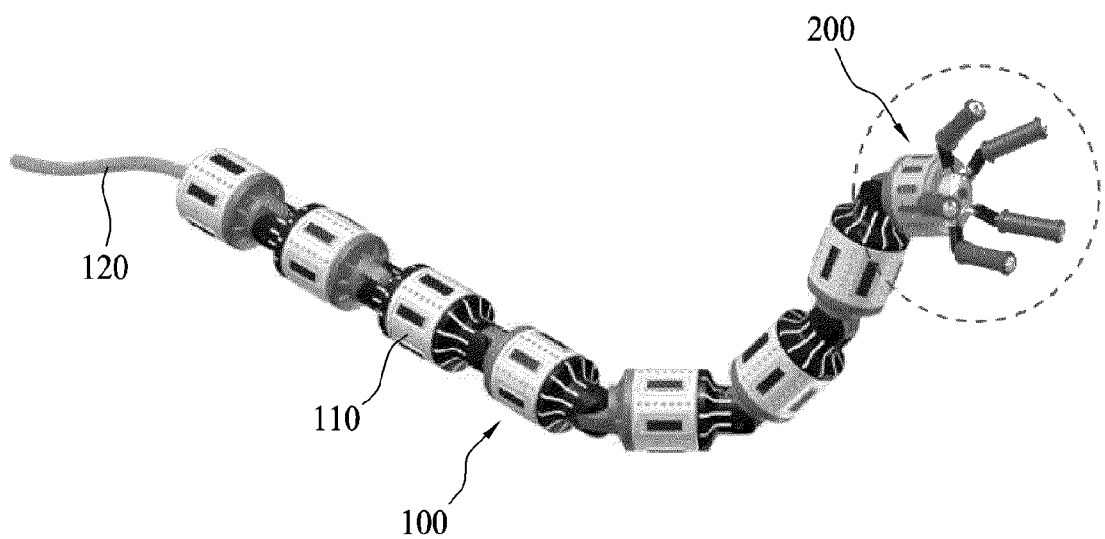
[FIG. 2]
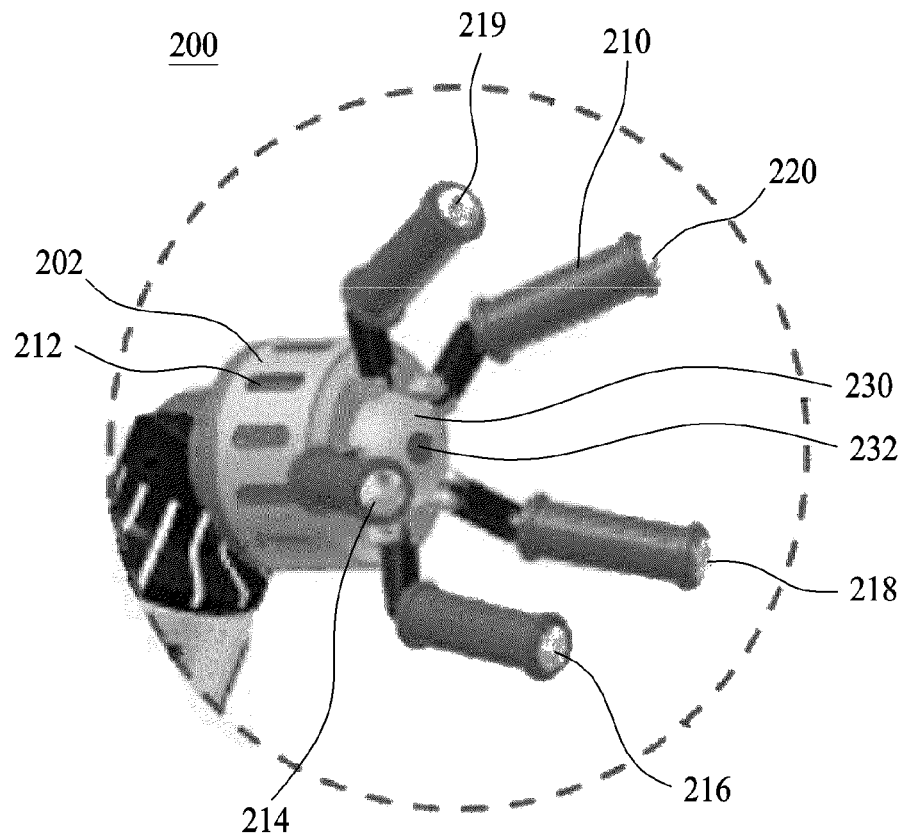

[FIG. 3]
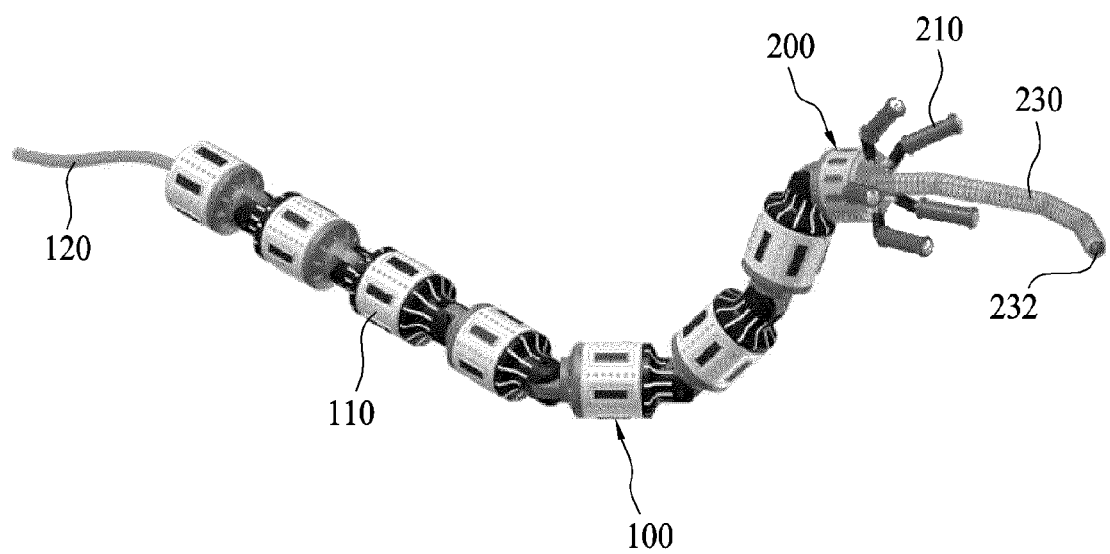

ROBOT FOR DETECTING AND SAVING LIFE IN SMALL SPACE

CROSS REFERENCE TO PRIOR APPLICATIONS

This application is the 35 U.S.C. 371 national stage of International application PCT/KR2019/016343 filed on Nov. 26, 2019, which claims priority to Korean Patent Application No. 10-2018-0147459 filed on Nov. 26, 2018. The entire contents of each of the above-identified applications are hereby incorporated by reference.

TECHNICAL FIELD

The present invention provides a robot for detecting and saving a life and more particularly, to a robot for detecting and saving a life which enters a small space to perform a detection operation and supply water and nutrients to survivors when detecting the life.

BACKGROUND ART

As electronics industry has been developed, technology for robots is rapidly improving. In particular, technology for various robots such as medical robots, industrial robots, military robots, home robots, etc. has been implemented and used for a variety of purposes. In the case of using robots, it is expected to be used for more applications in various environments in the future because it is possible to perform specific purposes such as inspection, reconnaissance, exploration, etc., even in environments where it is difficult for humans to enter.

However, most robots can be moved to perform missions and perform certain missions according to a control signal of a user, but since free movement is not yet secured, there is a problem that it is not easy to perform the missions in a variety of environments.

In order to solve this problem, recently, a variety of snake-shaped robots have been developed, but snake-type robots in the related art are mostly used for a single purpose of life detection in disasters such as building collapses, and there is a disadvantage that it is difficult for even the snake-type robots to further enter a small buried space.

Accordingly, there is a need for robots capable of detecting survivors and providing the survivors with water and nutrients by performing missions instead in an environment that is difficult for a person to directly perform the missions, particularly, additionally entering a small buried space that is difficult for even snake-types robots to enter.

DISCLOSURE

Technical Problem

The present invention is derived to solve the problems in the related art and objects of the present invention are as follows.

First, an object of the present invention is to provide a robot for detecting and saving a life capable of additionally entering a small buried space that is difficult for a snake-type robot to enter.

Second, an object of the present invention is to provide a robot for detecting and saving a life capable of providing survivors with water and nutrients when finding the survivors.

The objects of the present disclosure are not limited to the aforementioned objects, and other objects, which are not mentioned above, will be apparent to a person having ordinary skill in the art from the following description.

Technical Solution

In order to achieve the objects, the present invention provides a robot for detecting and saving a life, comprising: a body part including a plurality of unit joints; a head part which is provided at the front of the body part in a direction where the body part moves forward and includes a gripper capable of picking up an object by a plurality of tongs parts which are folded and unfolded; and an extension part provided to extend forward from the head part so as to enter a small space that is difficult for the body part to enter.

A heat source sensor for sensing a heat source may be provided in one of the plurality of tongs parts.

A smoke sensor for sensing smoke may be provided in one of the plurality of tongs parts.

An extinguishing liquid may be stored inside the head part and extinguishing liquid injection holes for injecting the extinguishing liquid may be formed on an outer circumferential surface of the head part to inject the extinguishing liquid when the heat source is sensed by the heat source sensor or the smoke is sensed by the smoke sensor.

A sonic sensor may be provided in one of the tongs parts to transmit a signal detected from the sonic sensor to rescuers or a rescue center and detect a rescue signal of the survivor.

A communication module may be provided in one of the tongs parts to determine conditions of the survivor through the communication module when the rescue signal of the survivor is detected in the sonic sensor.

A camera module may be provided in the head part or the extension part to photograph a progressing direction of the body part and transmit the photographed progressing direction to the rescue center and the rescue center may determine the progressing direction through images input from the camera module.

A supply line for supplying water and nutrients may be provided in the extension part to provide the survivor with the water and nutrients when finding the survivor.

Advantageous Effects

Effects of the present invention configured as above are described as below.

First, according to the robot for detecting and saving the life according to an embodiment of the present invention, the extension part is provided to enter a small space that is difficult for the body part to enter and the water and the nutrients are supplied to the survivors through the extension part to extend a survival time.

Second, according to the robot for detecting and saving the life according to an embodiment of the present invention, the gripper is provided so as to remove obstacles or stably induce a progressing direction when entering the small space.

Third, according to the robot for detecting and saving the life according to an embodiment of the present invention, various sensors and the communication module are provided in the head part to improve rescue accuracy by quick and accurate exchange of information between survivors and rescuers at a buried site.

The effects of the present invention are not limited to the aforementioned effects, and other effects not mentioned above will be clearly understood to those skilled in the art from the description of the appended claims.

DESCRIPTION OF DRAWINGS

The detailed description of according to a preferred embodiment of the present application to be described below and the summary described above will be able to be better appreciated when reading the detailed description and the summary in association with the accompanying drawings. Preferred embodiments are illustrated for the purpose of illustrating the present invention. However, the present application is not limited to the illustrated accurate arrangement and means.

FIG. 1 is a diagram illustrating a robot for detecting and saving a life according to an embodiment of the present invention;

FIG. 2 is a diagram enlarging a head part of the robot for detecting and saving the life according to an embodiment of the present invention; and FIG. 3 is a diagram illustrating a state in which an extension part is extended in the robot for detecting and saving the life according to an embodiment of the present invention.

MODES FOR THE INVENTION

Hereinafter, a preferred embodiment of the present invention, in which objects of the present invention can be realized in detail, will be described with reference to the accompanying drawings. In describing the embodiment, like names and like reference numerals are used with respect to like components and the resulting additional description thereof will be omitted.

The present invention is to secure golden time according to a rescue by entering a place and an environment that are difficult for firefighters to enter at building collapse and buried sites to perform rapid fire suppression and survivor rescue. Hereinafter, a robot for detecting and saving a life according to an embodiment of the present invention will be described with reference to the accompanying drawings.

FIG. 1 is a diagram illustrating a robot for detecting and saving a life according to an embodiment of the present invention, FIG. 2 is a diagram enlarging a head part of the robot for detecting and saving the life according to an embodiment of the present invention, and FIG. 3 is a diagram illustrating a state in which an extension part is extended in the robot for detecting and saving the life according to an embodiment of the present invention.

As illustrated in FIG. 1, a robot for detecting and saving a life according to an embodiment of the present invention includes a body part 100, a head part 200, and an extension part 230.

The main body 100 consists of a plurality of unit joints 110. The unit joints 110 are rotatably connected to each other in a plurality of directions so as to easily adjust a direction and move forward in a small space, and each motor (not illustrated) may be provided in each unit joint 110. Further, the body part 100 is applied with a lightweight frame energy-saving robotic system to enable effective entry into building collapse and buried sites.

A communication cable 120 is located inside the body part 100, and the communication cable 120 is to collect data through a communication module 214 equipped in the head part 200 to be described below and communicate with survivors.

As illustrated in FIG. 2, the head part 200 is provided at the front of the body part in a direction in which the body part 100 moves forward. The head part includes a head body 202 and a gripper which is provided in the head body 202 and picks up an object by a plurality of tongs parts 210 that are folded and unfolded. The gripper may remove obstacles when entering the small space and stably induce a progressing direction.

Meanwhile, in the head body 202 or the extension part 230, a light and a camera module 220 are provided, wherein the light is to illuminate a dark space and the camera module 220 photographs the progressing direction. Images photographed by the camera module 220 are transmitted to a rescue center through the communication cable 120 described above and the rescue center determines the progressing direction by analyzing an algorithm with a computer.

As a result, it is possible to reach a destination along a complex route. Further, the camera module 220 may secure a situation determination function of a buried environment and survivors before performing excavation for full-scale lifesaving at building collapse and buried sites.

A heat source sensor 218 for sensing a heat source is provided in one of the plurality of tongs parts 210. In addition, a smoke sensor 219 for sensing smoke is provided in one of the plurality of tongs parts 210. The heat source sensor 218 and the smoke sensor 219 are connected with the communication cable 120 and detect gas leakage, fire, smoke, surroundings of the survivors, or the like during moving to provide information to the rescuers and the rescue center.

Further, an extinguishing liquid is stored in the head body 202 and injection holes 212 for injecting the extinguishing liquid may be formed on an outer circumferential surface of the head body 202. Accordingly, when the heat source is sensed by the heat source sensor 218 and the smoke is sensed by the smoke sensor 219, the extinguishing liquid is injected through the injection holes 212 to extinguish the fire, so as to help the robot of the embodiment to stably and smoothly enter and protect the survivors from various environments.

A sonic sensor 216 may be provided in one of the tongs parts 210. The sonic sensor 216 is connected to the communication cable 120 to transmit a signal detected from the sonic sensor 216 to the rescuers or the rescue center. As a result, it is possible to detect the rescue signal of the survivors.

In addition, a communication module 214 may be provided in one of the tongs parts 210. The communication module 214 is connected to the communication cable 120, and may output sounds input from the rescuers or the rescue center to the survivors and output sounds input from the survivors to the rescuers or the rescue center to determine conditions of the survivors. That is, the communication module 214 may help in determining a situation of the site and quickly determining a rescue method through the communication between the detected survivors and the rescuers or the rescue center.

As illustrated in FIG. 3, the extension part 230 is provided to extend forward from the head body 202 to enter a small space that is difficult for the body part 100 to enter. To this end, the extension part 230 is formed in a vine shape and applied with a soft material so as to be flexibly movable even in the small space. However, the extension part 230 is not limited to the vine shape, but may be configured in various shapes, such as a small cymbals type which can be extended or reduced. As such, the body part 100 and the extension part 230 are combined to secure a disaster and lifesaving system even in a small space that is impossible for the conventional snake-type robot to enter.

Even if the survivor is detected, when a lot of time is required depending on conditions and methods for the rescue, saving measures are needed to support survivors' lives, and as a result, a supply line 232 for supplying water and nutrients may be provided inside the extension part 230. Accordingly, when finding the survivor, the extension part 230 extends to a location of the survivor so as to provide the survivor with the water and nutrients, thereby ensuring a survival time.

As such, according to the robot of the present embodiment, it is possible to ensure golden time according to a rescue by entering a place and an environment that are difficult for firefighters to approach at building collapse and buried sites to quickly perform fire suppression and survivor rescue.

In addition, it is possible to improve rescue accuracy and strength rapid detection and saving activities by combining data of the gripper and various detection sensors equipped in the head part 200.

Further, it is possible to improve a lifesaving rate by detecting a life, determining conditions of survivors, and supplying water and nutrients at a buried site.

As described above, the prepared embodiment of the present invention has been as described, and in addition to the embodiments described above, a fact that the present invention can be materialized in other specific forms without departing from the gist or scope thereof will be apparent to those skilled in the art. Therefore, the aforementioned embodiments are not limited but should be considered to be illustrative, and accordingly, the present invention is not limited to the aforementioned description and may be modified within the scope of the appended claims and a range equivalent thereto.

The invention claimed is:

1. A robot for detecting and saving a life comprising:
   a body part including a plurality of unit joints extending in a length direction;
   a non-extendible head part which is provided at a front of the body part in a direction where the body part moves forward and includes a gripper capable of picking up an object by a plurality of tongs parts which are folded and unfolded, each of which includes sensors or modules performing different functions,
   the non-extendible head part having a cylindrical shape and comprising a plurality of injection holes formed on an outer circumferential surface of the cylindrical shape; and
   an extension part extended independently without being linked to the plurality of tongs parts and provided to extend forward from the non-extendible head part so as to enter a small space that is difficult for the body part to enter, with provision of a supply line supplying water and nutrients inside to provide water and nutrients to the survivor upon detection of the survivor.

2. The robot for detecting and saving the life of claim 1, wherein a heat source sensor for sensing a heat source is provided in one of the plurality of tongs parts.

3. The robot for detecting and saving the life of claim 2, wherein an extinguishing liquid is stored inside the non-extendible head part so that the extinguishing liquid is capable of being injected through the plurality of injection holes when the heat source is sensed by the heat source sensor or smoke sensed by a smoke sensor.

4. The robot for detecting and saving the life of claim 1, wherein a smoke sensor for sensing smoke is provided in one of the plurality of tongs parts.

5. The robot for detecting and saving the life of claim 4, wherein an extinguishing liquid is stored inside the non-extendible head part so that the extinguishing liquid is capable of being injected through the plurality of injection holes when the heat source is sensed by the heat source sensor or smoke sensed by a smoke sensor.

6. The robot for detecting and saving the life of claim 1, wherein a sonic sensor is provided in one of the tongs parts to transmit a signal detected from the sonic sensor to rescuers or a rescue center and detect a rescue signal of the survivor.

7. The robot for detecting and saving the life of claim 6, wherein a communication module is provided in one of the tongs parts to determine conditions of the survivor through the communication module when the rescue signal of the survivor is detected in the sonic sensor.

8. The robot for detecting and saving the life of claim 1, wherein a camera module is provided in the non-extendible head part or the extension part to photograph a progressing direction of the body part and transmit the photographed progressing direction to the rescue center, and the rescue center determines the progressing direction through images input from the camera module.

* * * * *